United States Patent [19]

Ikeda et al.

[11] Patent Number: 5,031,104
[45] Date of Patent: Jul. 9, 1991

[54] ADAPTIVE IN-VEHICLE ROUTE GUIDANCE SYSTEM

[75] Inventors: Takeo Ikeda; Masaaki Yoshii; Youichi Doi; Kunihiko Mitoh, all of Osaka, Japan

[73] Assignee: Sumitomo Electric Industries, Ltd., Osaka, Japan

[21] Appl. No.: 442,782

[22] Filed: Nov. 29, 1989

[30] Foreign Application Priority Data

Dec. 5, 1988 [JP] Japan ................................. 63-307563
Dec. 5, 1988 [JP] Japan ................................. 63-307564
Apr. 7, 1989 [JP] Japan ..................................... 1-88441

[51] Int. Cl.$^5$ ............................................. G06F 15/50
[52] U.S. Cl. ................................... 364/449; 340/990; 340/995
[58] Field of Search ............... 340/995, 990; 364/443, 364/449, 521

[56] References Cited

U.S. PATENT DOCUMENTS

| | | | |
|---|---|---|---|
| 4,504,913 | 3/1985 | Miura et al. | 364/449 |
| 4,570,227 | 2/1986 | Tachi et al. | 364/444 |
| 4,723,218 | 2/1988 | Hasebe et al. | 364/449 |
| 4,757,455 | 7/1988 | Tsunoda et al. | 364/449 |
| 4,796,189 | 1/1989 | Nakayama et al. | 364/449 |
| 4,926,336 | 5/1990 | Yamada | 364/444 |
| 4,937,753 | 6/1990 | Yamada | 364/449 |

OTHER PUBLICATIONS

"CarGuide-On Board Computer for Automobiles," 1984, National Computer Conference, pp. 697-706.

Primary Examiner—Thomas G. Black
Attorney, Agent, or Firm—Lane, Aitken & McCann

[57] ABSTRACT

An in-vehicle navigator comprises a map memory unit for memorizing road map data consisting of road data comprised of the combination of nodes and links, and background data such as buildings, a location detection unit for detecting a vehicle location, an initialization unit for inputting a destination, and route calculation conditions desired by a vehicle operator, and a route calculation unit for reading road map data containing a current location and the destination from the map memory unit. The route calculation unit also calculates a recommended route, based on the read road map data from the map memory unit and the read route computation conditions from the initialization unit. The navigator further comprises a memory unit for storing the recommended route, and a vehicle guidance unit for detecting an approach to a junction on the recommended route, based on the vehicle location. The vehicle guidance unit reads road map data containing the junction from the map memory unit, and enlarges and displays the road map containing the junction, together with the vehicle location and the recommended route.

7 Claims, 12 Drawing Sheets

FIG.5A

```
ROUTE MODE SELECTION

1. Shortest Time Route
   Preference ?
2. Shortest Distance Route
   Preference ?
3. Minimum Cost Route
   Preference ?
4. Least Right and Left Turn
   Route Preference ?
      ·
      ·
      ·
```

FIG.5B

| ROUTE MODE | RATIO | VARIATION? |
|---|---|---|
| YES | | |
| NO | | |
| $\alpha$ : 1.2.3. · · · · · · 10. | | |
| $\beta$ : 1.2.3. · · · · · · 10. | | |
| $\gamma$ : 1.2.3. · · · · · · 10. | | |
| $\delta$ : 1.2.3. · · · · · · 10. | | |
| $\varepsilon$ : 1.2.3. · · · · · · 10. | | |

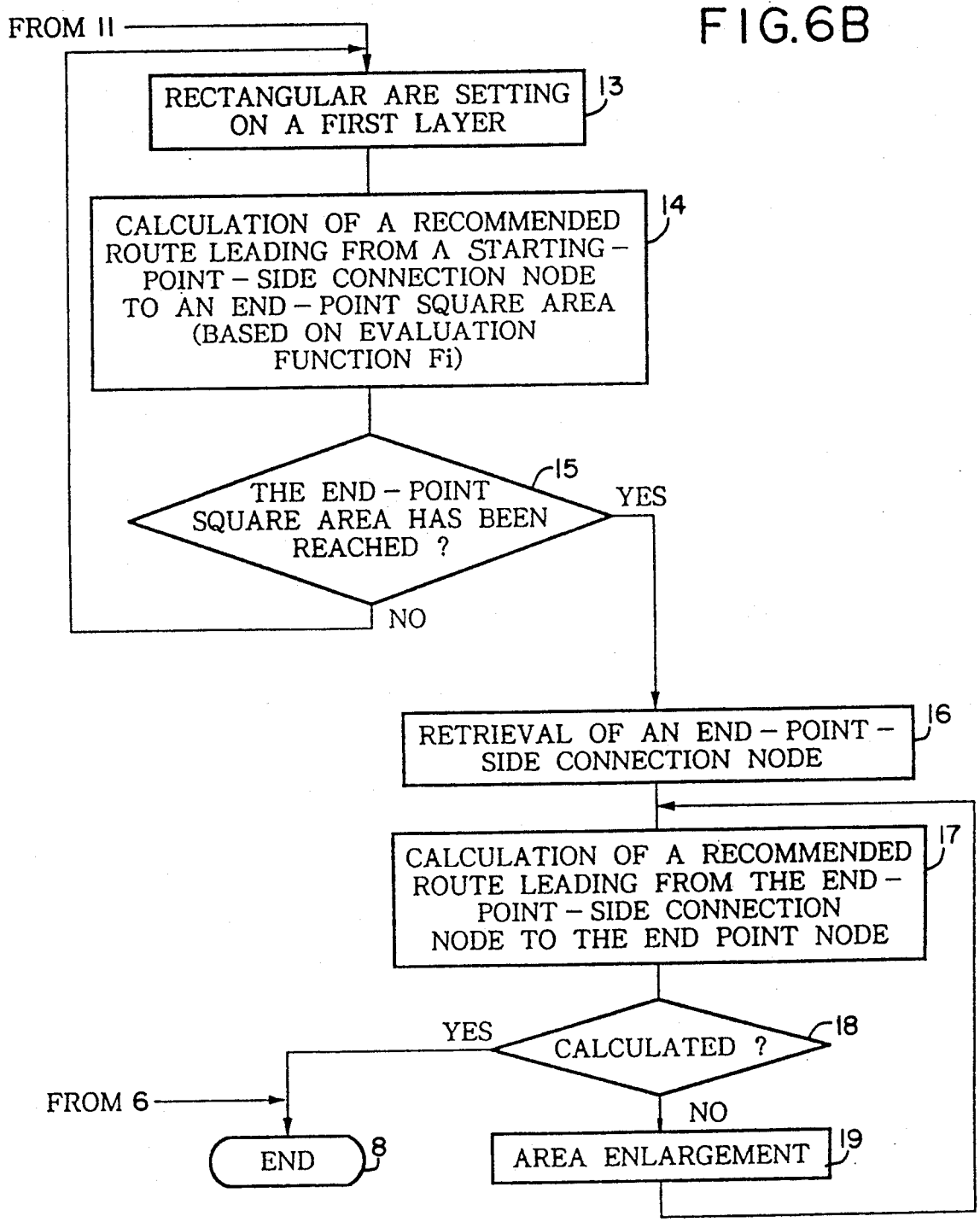

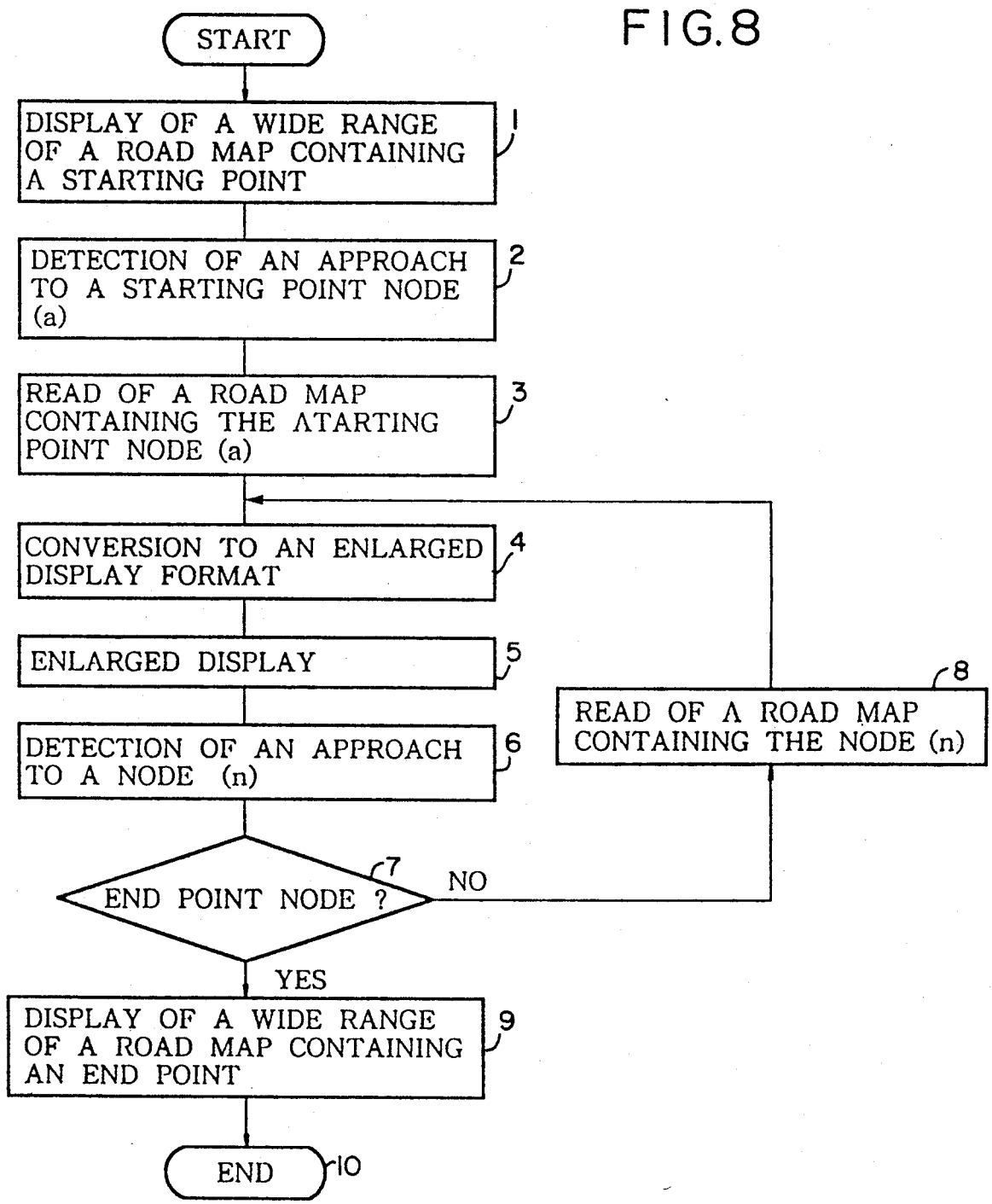

ADAPTIVE IN-VEHICLE ROUTE GUIDANCE SYSTEM

FIELD OF THE INVENTION

The present invention relates in general to an autonomous in-vehicle navigator, and in particular to such a navigator wherein, according to the setting of a destination by a vehicle operator, road map data containing the vehicle's current location and that destination is read from a map memory, and based on the road map data, a recommended route leading from the current location to the destination is calculated, and the vehicle is guided along the recommended route.

DESCRIPTION OF THE PRIOR ART

There are known in-vehicle navigators that display routes, etc. on the picture screen of the display in order to meet the convenience of travel on unfamiliar areas, at night and the like. As conventional in-vehicle navigators, there are dead reckoning navigation and map matching navigation. The dead reckoning navigation is one wherein a display, direction sensor, distance sensor, map memory, computer and the like are mounted in a vehicle, the coordinate location of the vehicle is calculated based on the direction change data inputted from the direction sensor and the travel distance data inputted from the distance sensor, and this calculated coordinate location is displayed on the road map that is displayed on the picture screen of the display. The map matching navigation is one which further improves the navigator by the above dead reckoning navigation and wherein a vehicle location on the road is detected by matching the coordinate location of the vehicle with the road stored in the map memory, and this vehicle location is displayed on the road displayed on the picture screen.

However, in both the above navigations, in order to guide a vehicle to a destination, the position of the destination is displayed on the road map that is picture displayed, and the route from the current location to the destination is judged by the vehicle operator.

In very recent years, there has been proposed a navigator which guides a vehicle, by entering a destination and a desired route mode (for example, shortest distance route, shortest time route and so on) by the driver before travel, calculating a route from the current location to the destination by using a trip time or trip distance as a parameter, and displaying this calculated route on the road map that is picture displayed.

As the above calculation method of the route from the current location to the destination, a so-called "Dijkstra" method has been adopted. This method assumes a net work leading from a starting point node to an end point node, successively adds all of the segments branching off from each node, and calculates a route that reaches the destination. If this method is used for route computation, the route leading from the current location to the destination will be obtained surely, as long as that route exists.

As a vehicle guidance method, there are one method which guides a vehicle along a recommended route displayed a road map on a predetermined scale, and another method which guides a vehicle by displaying the vehicle direction only with an arrow having 8 to 16 directions.

However, the above conventional methods have the following problems, since if the parameters of the route selection are time and distance only, a route is calculated based on either of two parameters that is selected by the vehicle operator.

(1) If a route is calculated using the same parameter, a great number of vehicles are to travel the same route, and traffic jam (so-called hunting phenomenon) is rather incurred.

(2) Since the amount of traffic varies depending upon environmental conditions such as time zone, traffic accident, road construction and the like, the shortest time route does not always become the shortest time route. As to the shortest distance route, the change of a route is unavoidable due to the unexpected conditions as above described. It is therefore little significant to set a parameter with one meaning.

(3) It is often desired that a route mode be changed according to different preferences, ages and feelings of different vehicle operators. In the case that a parameter is set with one meaning, there is the problem that the route mode cannot be changed.

In addition, if a route is calculated by the aforesaid "Dijkstra" method, and assuming each node has two branch paths relative to the travelling direction, the number of road segments is then increased exponentially. Therefore, in the case of a large number of nodes, there is the problem that a substantial time is required until the computation of a route is completed.

Moreover, although, in the method for displaying a recommend route on a road map on a predetermined scale, it is possible to schematically grasp a vehicle location from the road map because the recommended route is displayed on the road map on a scale of about 1/10000, there is the problem that it is difficult to judge in a moment which direction to travel, when the vehicle is approaching a junction.

Conversely, the method of displaying the travelling direction of a vehicle only with an arrow having 8 to 16 directions has a better visibility and can grasp momentary a route to be travelled, since it displays the vehicle direction with simple patterns. Further, the method has its advantage in that it has a small number of map data that are stored in the map memory, since the display form is simple. However, it cannot display junctions and the like wherein elevated roads and the like are combined complicatedly. In addition, since a road map is not displayed, the vehicle location on the road map cannot be judged. Furthermore, in the case of searching in a strange area for a destination, there is the problem that the destination cannot be searched for in the display of the forms of junctions.

As previously described, both the method wherein a recommended route is displayed on a road map on a predetermined scale and the method wherein the travelling direction of a vehicle is displayed only with an arrow having 8 to 16 directions, have merits and demerits. In addition, there is the problem that different displays are needed depending upon attributes of different roads (major artery or not), attributes of different junctions (complicated shape or not), area unfamiliarities of vehicle operators, and the like.

Accordingly, it is an object of the present invention to provide an improved in-vehicle navigator which makes it possible to vary the parameters requested for route computation in accordance with the preferences of a vehicle operator.

Another object of the present invention is to provide an improved in-vehicle navigator which makes it possible to alleviate traffic jam.

Still another object is to provide an improved in-vehicle navigator which makes it possible to reduce the time required for route computation.

Yet another object of the present invention is to provide an improved in-vehicle navigator which is capable of different displays in accordance with attributes of roads, attributes of junctions, and area unfamiliarities of vehicle operators.

SUMMARY OF THE INVENTION

In order to achieve the above objects, as shown in FIG. 1, the in-vehicle navigation of this invention comprises:

map memory means (A) for memorizing road map data consisting of road data comprised of the combination of nodes and links, and background data such as buildings;

location detection means (B) for detecting a vehicle location;

initialization means (C) for inputting a destination, and route calculation conditions desired by a vehicle operator;

route calculation means (D) for reading road map data containing a current location and the destination from the map memory means (A), and for calculating a recommended route, based on the read road map data and the route computation conditions inputted by the initialization means (C);

memory means (E) for storing the recommended route; and vehicle guidance means (F) for detecting an approach to a junction on the recommended route, based on the vehicle location detected by the location detection means (B), and for reading road map data containing the junction from the map memory means (A), and for enlarging and displaying the road map containing the junction, together with the vehicle location and the recommended route.

The invention constructed as above described can provide a route desired by the vehicle operator, by allowing the vehicle operator to input a destination and desired route calculation conditions through the initialization means (C), and calculating a recommended route by the route calculation means (D) on the basis of on the route calculation conditions inputted with the initialization means (C). Each time the vehicle approaches the junction of the recommended route stored in the memory means (E), the vehicle guidance means (F) reads road map data containing that junction from the map memory means (A), and enlarges and displays the road map containing the junction, the vehicle location and the recommended route. Accordingly, the vehicle operator is able t know the travelling direction of the vehicle visually and drive the vehicle safe.

In addition, the aforesaid initialization means (C) is characterized in that it causes the vehicle operator to select any one of a plurality of route calculation conditions determined based on the following evaluation function Fi, and is capable of varying a weighted ratio $\alpha$ of the evaluation function to a desired value of the vehicle operator;

$$Fi = \Sigma (ami \times Am)$$

where i is a route mode number, $\Sigma (\alpha m) = 1$, $\alpha m$ (m = 1, 2,..., n) is a weighted ratio of Am and A is an attribute of a link.

If the initialization means (C) is constructed as described above, the value of the weighted ratio of the evaluation function Fi can be varied according to the preferences of the vehicle operator, and therefore a recommended route can be calculated according to the preferences of the vehicle operator. Based on the inputted or varied evaluation function, the route calculation means (D) calculates a recommended route leading from the current location to the destination and provides the recommended route that is desired by the vehicle operator. In addition, since the evaluation function takes different human interests of different vehicle operators into account, the recommended route calculated based on the evaluation function is different from the conventional unified routes, has random characteristics, and can prevent a great number of vehicles from travelling the same road at the same time.

The aforesaid map memory means (A) is characterized in that it classifies in accordance with road classification from a highest class map wherein spacing between the nodes of the road data is widest to a lowest class map wherein spacing between the nodes of the road data is narrowest, and stores these classified maps. The aforesaid route calculation means (E) is characterized in that it defines a route retrieval area, based on a straight distance leading from the current location to the destination, and if the route retrieval area is in the same class map, calculates a recommended route by adding within the same class map the links leading from a node nearest to the current location to a node nearest to the destination, and if the route retrieval area is not in the same class, retrieves from the road data a current-location-side connection node connecting a lower class map and a higher class map and a destination-side connection node connecting the lower class map and the higher class map, and calculates a recommended route leading from a node nearest to the current location to a node nearest to the destination by the sum of a route of the lower class map from the node nearest to the current location to the current-location-side connection node, a route of the lower class map from the node nearest to the destination to the destination-side connection node and a route of the higher class map from the current-location-side connection node to the destination-side connection node.

When a plurality of classes are set as the route retrieval area, the starting-point-side and the end-point-side connection nodes connecting the higher class map and the lower class map are retrieved from the road net data, and as to the route calculation of the lower class map, the route from the node nearest to the current location to the starting-point-side connection node of the recommended route, and the route from the end-point-side node to the node nearest to the destination are calculated within the same class map, and as to the route between the connection nodes, the route is calculated within the higher class map wherein the spacing between the nodes are wider. Therefore, even if a route to be calculated is a long distance route, the time required for route calculation can be reduced.

The aforesaid vehicle guidance means is characterized in that it displays on the road map a starting point of the recommended route calculated by the route calculation means (D) and the vehicle location until the vehicle reaches the starting point, displays the recommended route, the vehicle location and form of the junction on the whole of a picture screen or a window of the picture screen during travel of the recommended route, and displays on the road map the destination and the vehicle location during travel from an end point of the recommended route to the destination.

Therefore, the vehicle guidance means is adaptable to the case that a vehicle travels alleyways at relatively lower speeds or that case that a vehicle travels streets which are completely unknown to the vehicle operator, since the vehicle location is grasped in a wider region by displaying the vehicle location, the starting point of the recommended route or the destination, together with the road map. In addition, by displaying the recommended route, vehicle location and form of junctions on the whole of the picture screen or the window of the picture screen, the vehicle guidance means is adaptable to roads such as arteries wherein it is necessary to judge the form of junctions momentarily.

In addition, the aforesaid vehicle guidance means (F) is characterized in that it performs a display of road map and vehicle location or a display of recommended route, vehicle location and junction form or a display of the combination of road map, recommended route, vehicle location and junction form, depending upon attributes of roads, attributes of junctions and unfamiliarities of areas of the vehicle operator.

In the arteries that vehicles travel at high speeds, junctions and areas which are relatively known to the vehicle operator, only the recommended route, vehicle location and form of junctions are displayed in accordance with the vehicle guidance means (F) constructed as described above. Therefore, the vehicle operator can know in a moment which road to select, and thus the vehicle can be guided safe. In addition, since, in the alleyways narrow where the vehicle cannot travel at high speeds or the area which are completely unknown to the vehicle operator, the road map is also displayed together with the recommend route, vehicle location and the like, the vehicle can be operated while knowing the vehicle location.

BRIEF DESCRIPTION OF THE DRAWINGS

The above and other objects and advantages will become apparent from the following detailed description when read in conjunction with the accompanying drawings wherein:

FIGS. 5A and 5B show initialization menus displayed on the picture screen of the video display of FIG. 2, respectively;

FIGS. 6A and 6B are block diagrams showing the major process steps used for route calculation;

FIG. 8 is a block diagram showing the major process steps used for route guidance.

DESCRIPTION OF THE PREFERRED EMBODIMENTS

Figure 1:
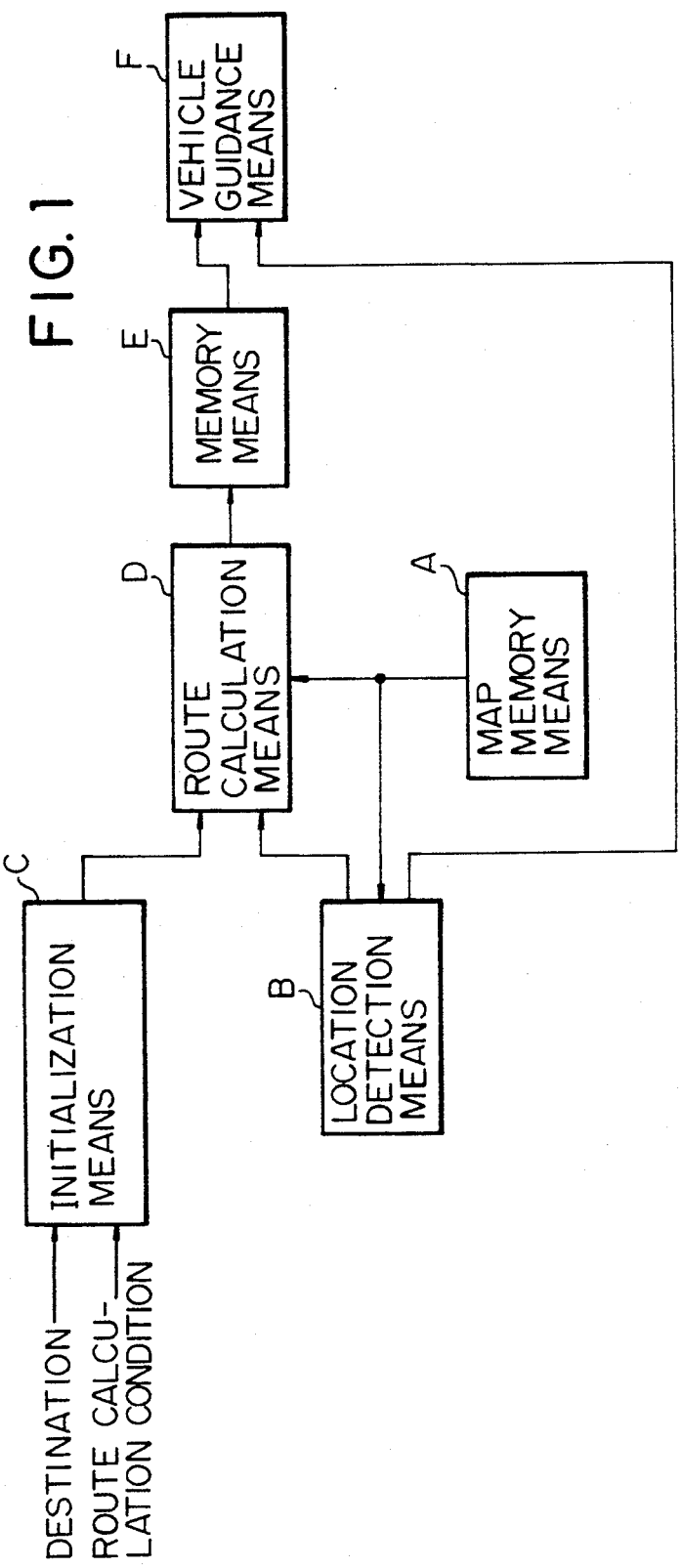
FIG. 1 is a block diagram illustrating schematically the principle of an in-vehicle navigator according to the present invention.
Figure 2:
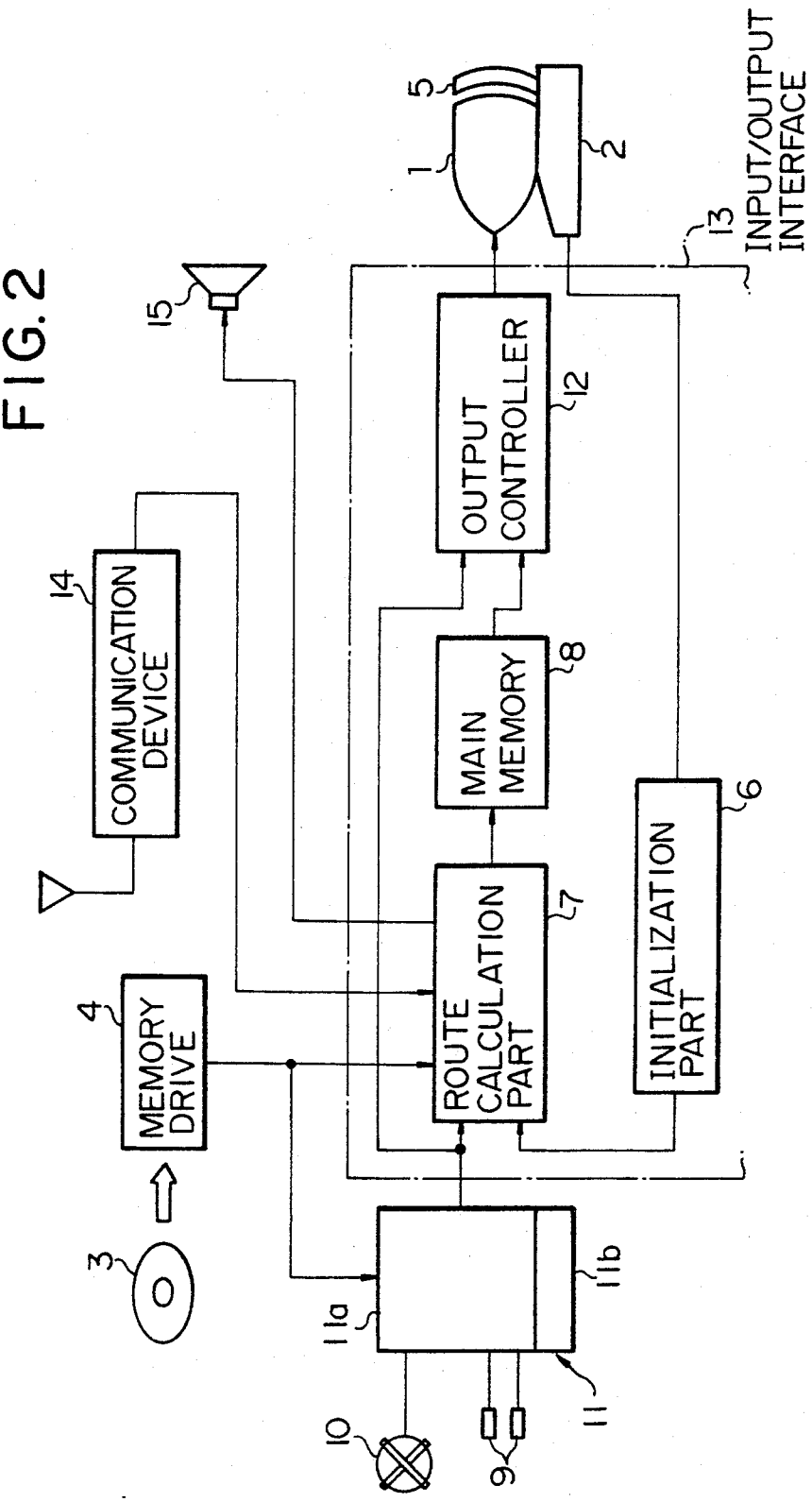
FIG. 2 is a block diagram illustrating schematically an embodiment of the in-vehicle navigator according to the present invention.

Referring now in greater detail to the drawings and initially to FIG. 2, there is shown a preferred embodiment of an in-vehicle navigator in accordance with the present invention.

The in-vehicle navigator comprises a video display 1, a console 2, a map memory 3, a memory drive 4, a touch panel 5, an initialization part 6, a route calculation part 7, a main memory 8, a distance sensor 9, a direction sensor 10, a locator 11, an output controller 12, and an input/output interface 13. Reference numeral 14 indicates a communication device for receiving road information transmitted from a control station, and 15 indicates an audio output device for informing a vehicle operator that the vehicle is approaching an intersection.

The video display 1 displays textual and line graphic information such as initialization menus, road maps, vehicle location, recommended routes and the like, at the predetermined dot positions. As this video display 1, a CRT (Cathode Ray Tube) display, crystalline panel display or the like can be employed.

The console 2 has a keyboard (not shown) which allows a vehicle operator to start and stop this device, and to move a cursor on the picture screen of the display 1 and to scroll the road map displayed on the picture screen.

The map memory 3 divides Japanese road map into mesh blocks, and stores road map data consisting of road data comprised of the combination of nodes and links, and background data such as buildings and the like. This road map data are used for graphic display and route calculation. As this map memory 3, a mass storage medium memory such as a CD-ROM, magnetic tape and the like can be employed.

A more detailed description of the above map memory 3 will be given hereinafter.

The map memory 3 divides Japanese road map on a scale of 1/2500 or 1/10000 with a longitude difference of 1 degree and a latitude difference of 40 minutes, and is comprised of a first mesh (FIG. 5C) having longitudinal and lateral distances of about 80 Km×80 Km, a second mesh (FIG. 5D) that is 1/64 of the first mesh and thus has longitudinal and lateral distances of about 10 Km×10 Km, and a third mesh (FIG. 5E) that is 1/100 of the second mesh and thus has longitudinal and lateral distances of about 1 Km×1 Km. The road net data of the first mesh through the third mesh are grouped into three classes of a first layer through a third layer. The roads of the first layer are comprised of freeways and major arteries. The roads of the second layer are comprised of the roads of the first layer and minor arteries. The roads of the third layer are comprised of all streets including alleyways.

The nodes comprise junction nodes and auxiliary nodes disposed between the junction nodes. As node data, there are a node number, address of the node of the high class or low class mesh corresponding to the node number or addresses of the nodes of the surrounding meshes corresponding to the node number, addresses of the surrounding nodes, addresses of links connected to nodes, and so on.

The link data are a link number, addresses of link starting point and link end point nodes, link distance, time data needed for travelling a link, road classification (freeways, arteries, streets), road width, traffic restrictions such as one-way streets, turn restrictions, toll roads, and so on.

The background data contain railways, rivers, place-names, famous facilities, spots prestored by a vehicle operator, contours and the like. The contours are generally not displayed, but employed as data at the time of a route mode initialization. It is noted that the spacing between the nodes can be set to a further reduced spacing, depending upon the capacity of the map memory 3 or the processing speed of the route calculation part 7.

The touch panel 5 is attached on the picture screen of the display 1, has transference electrodes arranged with identical patterns in the form of a matrix, and outputs the position touched by a vehicle operator to the initialization part 6.

The initialization part 6 causes the display 1 to display a road map for inputting a destination, a plurality of route modes based on an evaluation function Fi defined by the following equation (I), and numerals for varying the value of a weighted ratio $\alpha m$ of the evaluation function Fi, and causes a vehicle operator to touch the display position to input a destination and a desired route mode.

$$Fi = \Sigma (\alpha mi \times Am) \quad (I)$$

where i is a route mode number, $\Sigma(\alpha m) = 1$, $\alpha m$ (m = 1, 2, ... n) is a weighted ratio of Am, and Am is A1: total trip time of route,
A2: total trip distance of route ÷ speed coefficient,
A3: total trip cost of route ÷ unit time cost coefficient,
A4: (total number of left turns of route x left turn time coefficient) + (total number of right turns of route x right turn time coefficient), and
A5: number of passings of signal x signal passing time.

More particularly, the setting and the like of the aforesaid destination and evaluation function Fi are performed according to initialization menus displayed on the display 1. As these initialization menus, there are (1) Spot setting menu: It displays a road map, and causes a vehicle operator to touch the position of a destination on the displayed road map and also the positions of progress points on the route.

(2) Route mode setting menu: It displays multiple sorts of route modes corresponding to the evaluation function Fi whose weighted ratio $\alpha m$ has been prestored by the vehicle operator, and causes the vehicle operator to touch the position of a desired route mode. As the route modes, there are a mode that has a preference to a shortest time route wherein the weighted ratio $\alpha 1$ of the time parameter A1 of the evaluation function Fi has been rendered greatest, a mode that has a preference to a shortest distance route wherein the weighted ratio $\alpha 2$ of the distance parameter A2 has been rendered greatest, a mode that has a preference to a minimum cost route wherein the weighted ratio $\alpha 3$ of the trip cost parameter A3 has been rendered greatest, and a mode that has a preference to a least right and left turn route wherein the weighted ratio $\alpha 4$ of the number of right and left turns has been rendered greatest. In addition to the above route modes, there are a route mode having a preference to sightseeing resorts, a route mode having a preference to roads familiar to a vehicle operator, a route mode having a preference to roads along mountains, a route mode having a preference to roads along coast lines, and a route mode having a preference to wider roads. The route modes as above described can be inputted in accordance with the link data (type, distance, trip time, etc.) and the background data (place-name, famous facility, contour, etc.).

(3) Ratio setting menu: It displays the values of the weighted ratios for varying the content of the evaluation function Fi, and causes the vehicle operator to touch the value of a desired weighted ratio. If, for example, 1 is selected for the weighted ratio $\alpha 1$, the evaluation function Fi becomes Fi=A1, and a route calculated becomes a shortest time route.

(4) Other setting menus: There is a menu that displays the sort of a display form such as a rotation mode which fixes the travelling direction of a vehicle and rotates the surrounding map on the vehicle, a fixed mode which fixes a map in the north direction, and the like. The vehicle operator touches the position of a desired display mode to input that mode.

It is noted that the aforesaid destination may also be inputted through the keyboard of the console 2. In this case, the destination may also be inputted by selecting it from the spot data such as the place name list, famous facility list, and spots prestored by the vehicle operator. In addition, it is possible that a vehicle operator himself or herself designates progress spots on the route.

In accordance with the destination setting by the vehicle operator, the route calculation part 7 reads from the map memory 3 a predetermined range of road map data containing a node on an artery nearest to the vehicle current location detected by the locator 11 (hereinafter referred to as a starting point node) and a node on an artery nearest to the destination (hereinafter referred to as an end point node). The route calculation part 7 then calculates a recommended route leading from the starting node to the end point node, under the condition of the evaluation function Fi corresponding to the route mode inputted by the vehicle operator and according to the aforesaid "Dijkstra" method. In addition, the route calculation part 7 varies the content of the evaluation function Fi according to the value of the weighted ratio $\alpha m$ inputted by the vehicle operator, and based on this varied evaluation function, calculates a recommended route leading from the starting point node to the end point node. The calculation of this recommended route is performed by, based on the node addresses of the high class mesh respectively connected to the starting point and end point nodes, searching for the nodes of the high class mesh, and by using the road map data of the high class mesh.

The main memory 8 temporarily stores the recommended route calculated by the route calculation part 7. Concretely, it stores the junction nodes.

The locator 11 has a map memory 11a for location detection and a microcomputer 11b. The map memory 11a for location detection stores the addresses of divided nodes that divide all the roads in a predetermined range (for example, road map on a scale of 1/500) at intervals of a predetermined distance, addresses of junction nodes, and addresses of the surrounding nodes related to each node. The position of the nodes is determined corresponding to paths that a vehicle actually travels. The microcomputer 11b of the locator 11 calculates travel track data by integrating the distance data detected by the distance sensor 9 and integrating the direction change data detected by the direction sensor 10 and detects the vehicle location, based on the similarity of this calculated travel track data and the road patterns stored in the location-detection map memory 11a. The direction sensor 10 detects changes in the direction of a vehicle during travel, and may comprise a terrestrial magnetism sensor, gyro, vehicle wheel speed sensors for detecting an angle of turn from the difference between the number of rotations of left and right vehicle wheels, or the like. The distance sensor 9 detects the distance that a vehicle has travelled, from the vehicle speed or the number of rotations of the vehicle wheel and may comprise vehicle wheel speed sensors, vehicle speed sensors or the like. It is also possible that the map memory 11a for location detection and the map memory 3 are employed in common.

Figure 3:
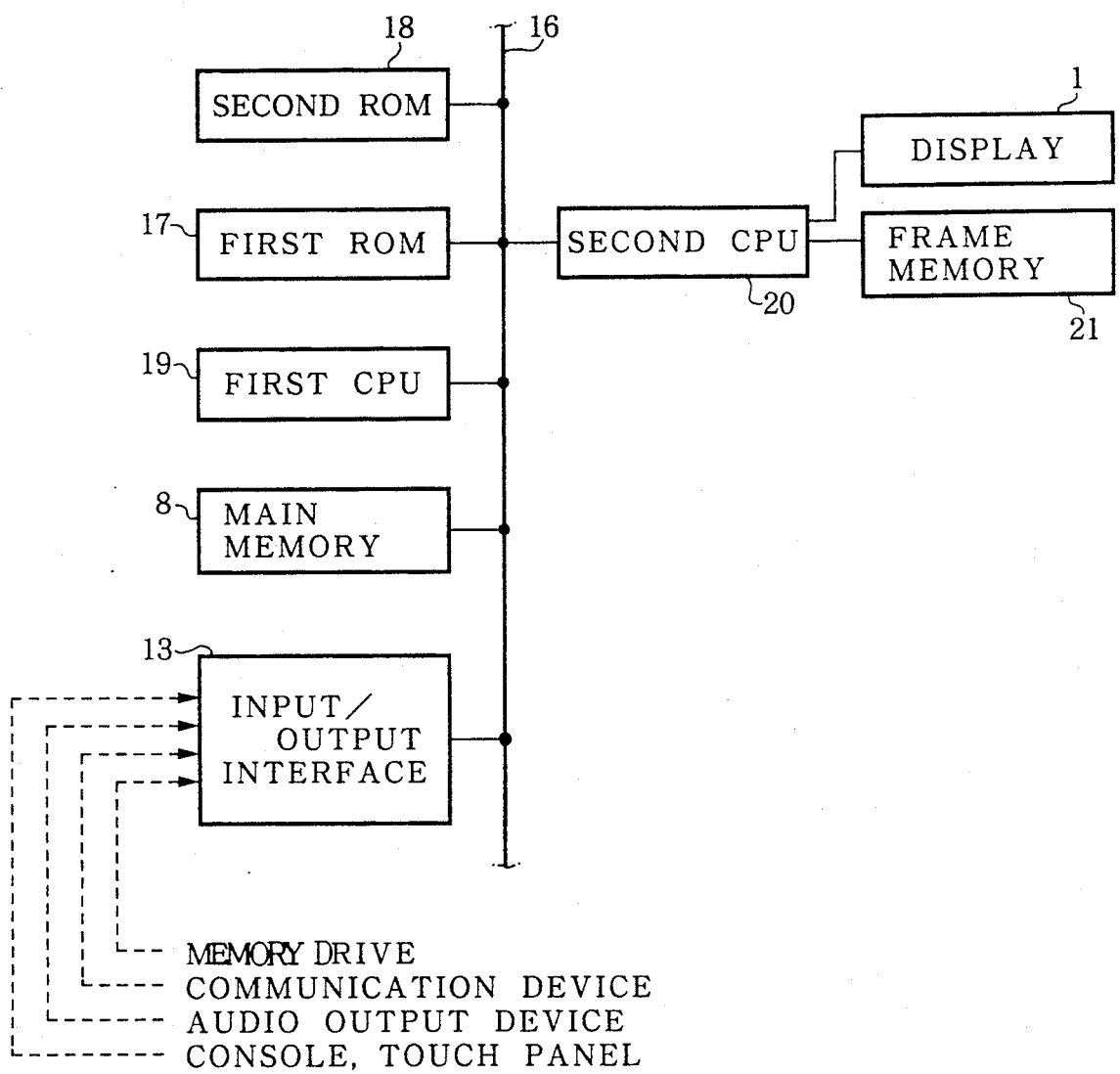
FIG. 3 illustrates the hardware of the route calculation part, main memory and output controller of FIG. 2.

FIG. 3 shows the hardware structure of the aforesaid route calculation part 7, main memory 8 and output controller 12. To a bus line 16 are connected the main memory 8, a first read-only memory (first ROM) 17 that stores programs for route calculation, a second ROM 18 that stores programs for route guidance, a first central processing unit (first CPU) 19 that executes the recommended route calculation and the route guidance on the basis of the route calculation programs and the route guidance programs, the input/output interface 13, and a second CPU 20 for display. To the second CPU 20 for display is connected a frame memory 21. To the input/output interface 13 is connected the communication device 14 and the audio output device 15. That is, the first ROM 17, second ROM 18 and first CPU 19 perform the route calculation and the route guidance. The second CPU 20, and the output controller 12 comprised of the frame memory 21 display road maps and the like with a predetermined form.

The first CPU 19 determines the evaluation function Fi according to the selected or varied route mode from the initialization part 6. In addition, in accordance with the destination selected by the vehicle operator, the first CPU 19 reads the road net data containing the starting point and end point nodes from the map memory 3 (the first layer or second layer is used). Thereafter, based on the determined evaluation function Fi, the first CPU 19 calculates a recommended route leading from the starting point node to the end point node. Based on information on traffic jam and the like inputted from the communication device 14, the first CPU 19 also calculates a new recommended route. The recommended route calculated by the first CPU 19 is stored temporarily in the main memory 8, and each time the vehicle approaches the starting point node, end point node or junctions that have been stored in the main memory 8, the road map data containing junctions are read from the map memory 3. This road map data is format converted to the rotation display data that is used in the rotation mode which fixes the travelling direction of a vehicle and rotates the surrounding map on the vehicle location, and also format converted to a display form of better visibility, and then transmitted to the output controller 12. In addition, the first CPU 19 outputs a warning signal to the audio output device 15, which then produces a warning audio chime that the vehicle is approaching junctions.

The second CPU 20 writes the road map data, which has been format converted by the first CPU 19, to the frame memory 21, and causes the display 1 to display that road map data.

Figure 4A:
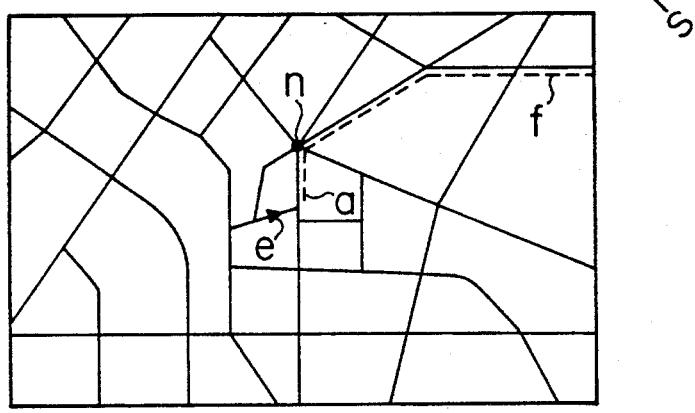
FIG. 4A shows a display form before the vehicle approaches the starting point node of the recommended route.
Figure 4B:
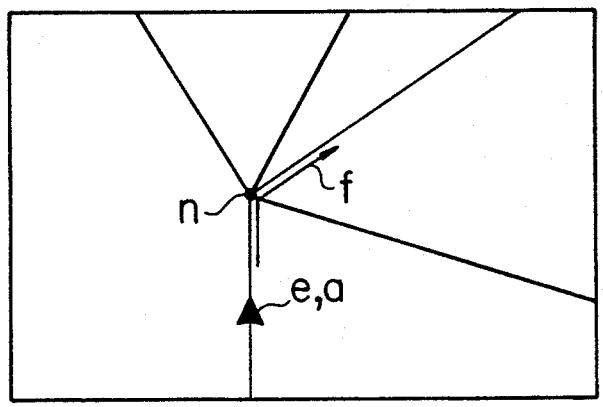
FIG. 4B shows another display form at the time the vehicle has approached the starting point node.

FIGS. 4A and 4B are diagrams which serve to explain the display form as above described. FIG. 4A is a diagram showing a display form before a vehicle approaches the starting node (a), while FIG. 4B is a diagram showing a display form at the time a vehicle has approached the starting node (a). That is, when the vehicle is in a position spaced apart a predetermined distance from the starting point node (a), a wide range of a road map is displayed, while if the vehicle comes close to the starting point node (a), a road map containing the starting point node (a), vehicle location (e), and recommended route (f) are displayed with an enlarged scale, as shown in FIG. 4B. It is noted that, by providing a window in the picture screen of the display 1, a display form of better visibility may also be displayed inside the window, and a wide range of a road map displayed outside the window.

The operation of the in-vehicle navigator constructed as described above will hereinafter be described in detail, making reference to FIGS. 5 through 8.

The initialization operation will be as follows.

(1) As shown in FIG. 5A, there are listed a mode having a preference to a shortest time route, a mode having a preference to a shortest distance route, a mode having a preference to a minimum cost route, and the like. The vehicle operator touches the position of a desired mode to select a mode for route calculation from the list displayed by the display 1.

(2) After the selection of the desired mode, the vehicle operator determines whether a weighted ratio is varied or not, as shown in FIG. 5B. If the answer of the vehicle operator is "NO", a recommended route is selected with the previous mode. If "YES", the weighted ratio $am$ and numerals for setting that ratio $am$ are displayed. The vehicle operator touches the position of a desired numeral.

(3) The weighted ratio $am$ of the evaluation function Fi is then varied according to the numeral selected by the vehicle operator.

Figure 5C:
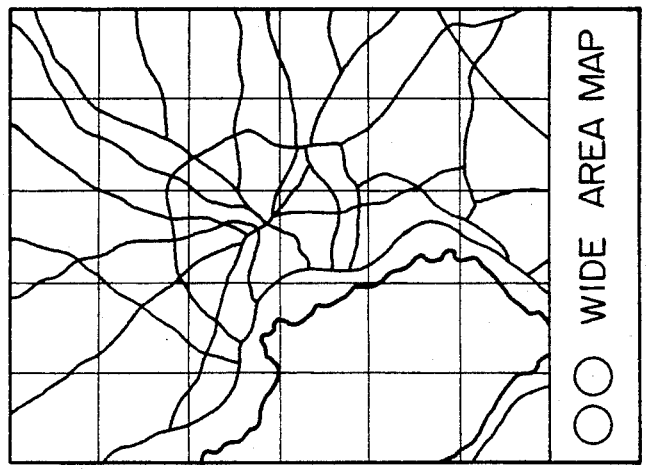
FIG. 5C shows a first layer road map comprised of freeways and major arteries.

(4) Thereafter, the road map of the first layer is displayed as shown if FIG. 5C. In the case that the above input processes (1) to (3) are omitted and this input process (4) is performed, a route mode that has been selected from the route modes of the input process (1) by the vehicle operator is selected.

Figure 5D:
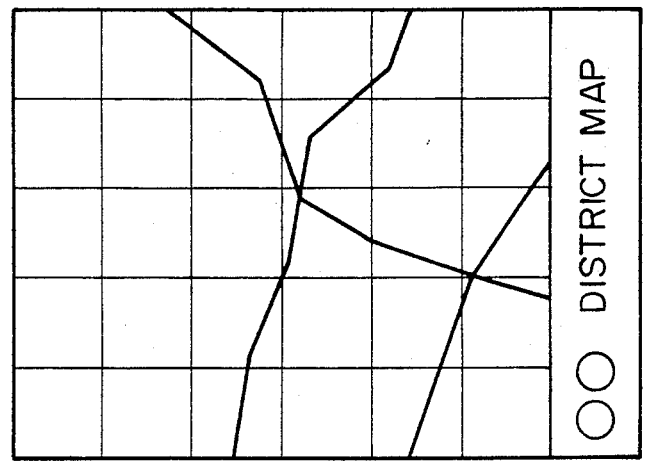
FIG. 5D shows a second layer road map comprised of freeways, major arteries and minor arteries.

(5) The vehicle operator touches the position of the mesh of the first layer containing the destination to select the mesh of the second layer containing that destination. The road map of the second layer selected is then displayed, as shown in FIG. 5D.

(6) The position of the mesh of the second layer containing the destination is touched to select the mesh of the third layer containing the destination. That position of the mesh of the selected third layer may be selected as a destination. Then, the central portion of the road map of the selected third layer is displayed, as shown in FIG. 5E.

Figure 5E:
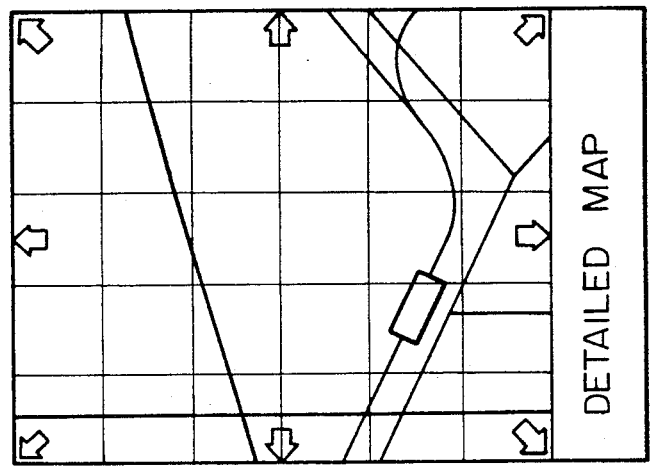
FIG. 5E shows a third layer road map comprised of all streets containing alleyways.

(7) The position of the destination is searched for and touched by scrolling the road map of the third layer, as shown in FIG. 5E.

Figure 5F:
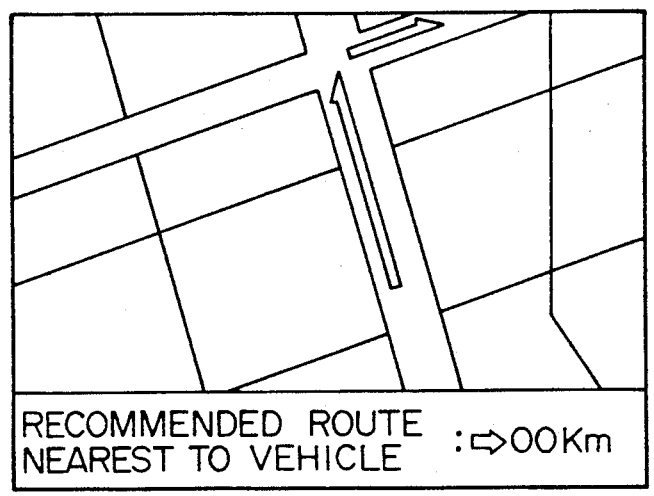
FIG. 5F shows a display of a vehicle current location after the initialization has been inputted.

(8) After the initialization has been performed in the way as above described, the display of FIG. 5E is returned back to the display of the current location of the vehicle, as shown in FIG. 5F and the calculation of the recommend route is performed.

Figure 6A:
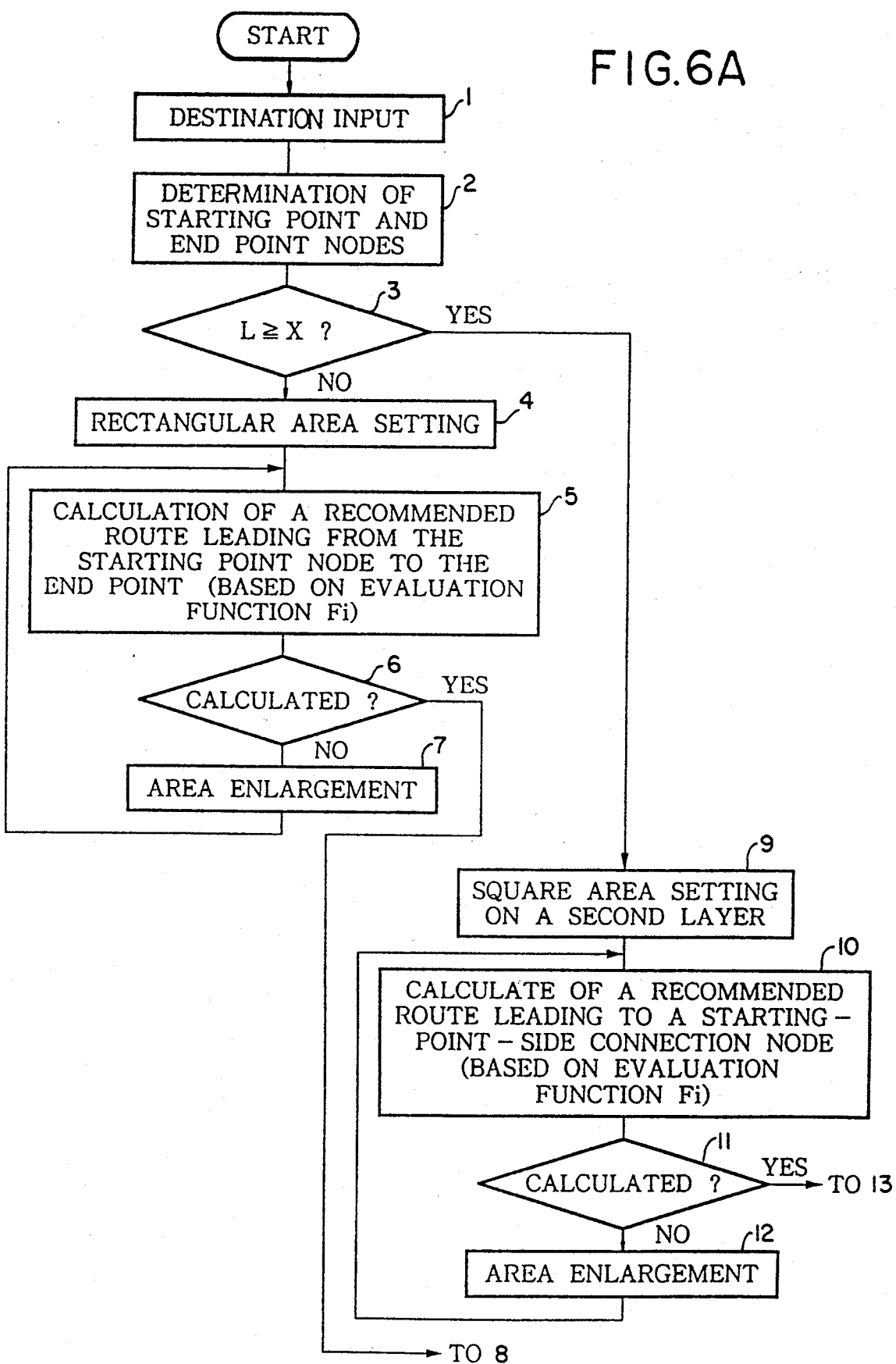
Figure 7A:
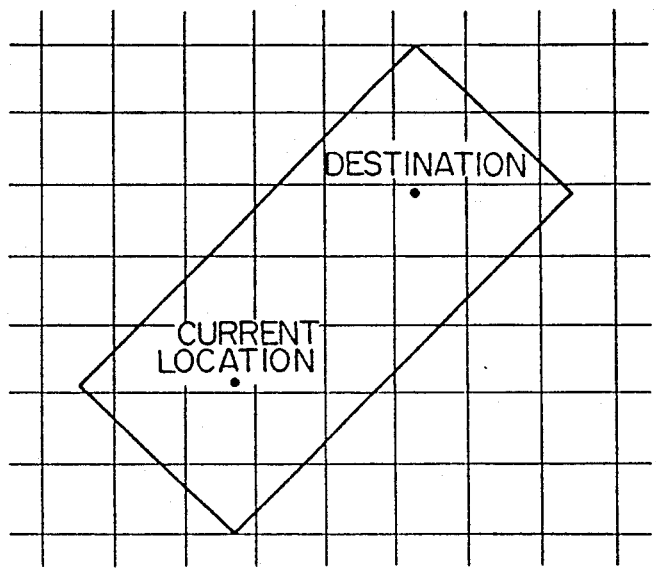
FIG. 7A is a diagram which serves to explain the setting of route retrieval area when the straight distance between the current location and the destination is short.
Figure 7B:
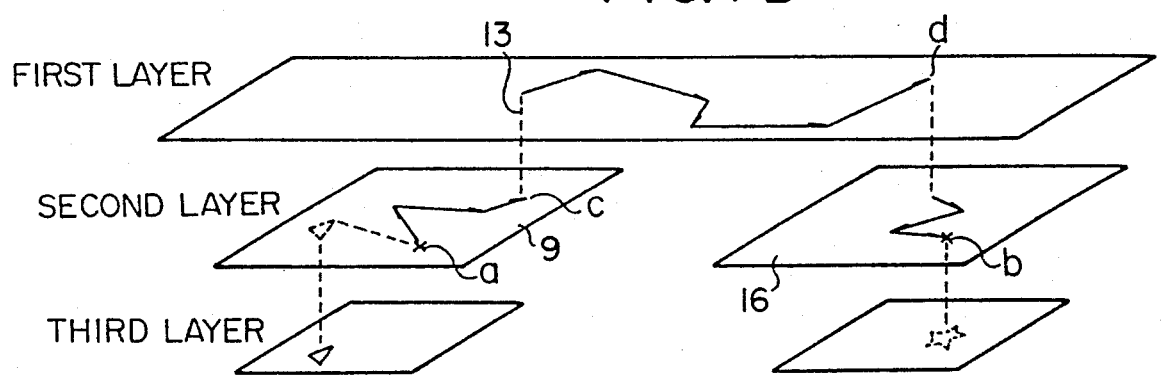
FIG. 7B is a schematic view which serves to explain the setting of route retrieval areas when the straight distance between the current location and the destination is long.

FIGS. 6A and 6B are block diagrams showing the major process steps used for route calculation, FIG. 7A is a diagram which serves to explain the setting of a route retrieval area when the straight distance between the current location and the destination is short, and FIG. 7B is a schematic view which serves to explain the setting of route retrieval areas when that distance is long.

In step 1 of FIG. 6A, the vehicle location detected by the locator 11 and the aforesaid destination ar entered. In step 2, when the current location or destination is in an alleyway, an automatic retrieve is not performed, and a node on the nearest artery from the current location is defined as the aforesaid starting end node (a), and a node on the nearest artery from the destination is defined as the aforesaid end point node (b). In step 3, it is determined whether the straight distance L leading from the current location to the destination is longer than a predetermined distance x. This distance x is approximately 20 Km for metropolitan areas and approximately 30 Km for suburban areas. When it is determined that the straight distance L is shorter than the predetermined distance x, a rectangular area of the second layer containing the current location and the destination is set in step 4, as shown in FIG. 7A. In step 5, a recommended route is calculated based on the evaluation function Fmi corresponding the route mode previously set. In step 6, it is determined whether a recommended route to the end point node (b) is calculated or not. When it is determined that the recommended route to the end point node (b) has not been calculated, the rectangular area set in the step 4 is magnified, and the steps 5 and 6 are repeated. In this case, the number of magnifications of the area is limited in order to avoid an external loop.

In the above step 6, when it is determined that the recommended route has been calculated, the step 6 proceeds to the step 8 of FIG. 6B to complete the processing of the recommended route calculation.

In the above step 3, when it is determined that the straight distance L is longer than the predetermined distance x, the step 3 proceeds to step 9, and in the step 9 an square area containing the current location is set within the second layer, as shown in FIG. 7B. In step 10, a node of the second mesh and a node of the first mesh that are connected with the starting point node (a) (hereinafter referred to as a starting-point-side interlayer connection node (c)) are searched for, and a recommended route from the starting point node (a) to the starting-point-side interlayer connection node (c) is calculated based on the evaluation function Fi. In step 11, it is determined whether the recommended route to the starting-point-side interlayer connection node (c) has been calculated or not. When it is determined that the starting-point-side interlayer connection node (c) has not been calculated, the square area set in the step 9 is magnified in step 12 and the steps 10 and 11 are repeated. Also in this case, the number of magnifications of the square area is limited to avoid an external loop. When in the aforesaid step 11 it is determined that the recommended route to the starting-point-side interlayer connection node (c) has been calculated, the step 11 proceeds to the step 13 of FIG. 6B, and a rectangular area is set in the first layer, as shown in FIG. 7B. In step 14, a recommended route from the starting-point-side interlayer connection node (c) to the end-point-side square area containing the destination is calculated based on the evaluation function Fmi set by the vehicle operator. In step 15, it is determined whether or not the end-point-side square area has been reached (i.e., whether the recommended route has been calculated or not). When it is determined that the recommended route has not been calculated, the steps 13 and 14 are repeated.

When the recommended route has been calculated in the aforesaid step 14, a node connected within the square area with the end-point node (b) (hereinafter referred to a end-point-side interlayer connection node (d) is searched for in step 16, as shown in FIG. 7B. In step 17, a recommended route from the end-point-side interlayer connection node (d) to the end point node (b) is calculated based on the evaluation function Fi set by the vehicle operator. In step 18, it is determined whether a recommended route from the end-point-side interlayer connection node (d) to the second layer has been calculated or not. When the recommended route has not been calculated, the square area is magnified in step 19, and the steps 17 and 18 are repeated. When in the step 18 it is determined that the recommended route has been calculated, the step 18 proceeds to the step 8 to complete the recommended route calculation.

As previously described, in the recommended route calculation according to the present invention, based on the straight distance leading from the current location to the destination, the area of the second mesh is defined to a rectangular area for a short distance route computation or an square area for a long distance route computation. Since only road net data within the aforesaid rectangular area are read in the case of the short distance route computation, the time needed for reading road net data can be reduced. In addition, since the recommended route is calculated by adding road segments in the defined area, the time needed for calculating the route leading from the starting point node (a) to the end point node (b) can be greatly reduced. In the case of the long distance route computation, the route between the starting point node (a) and the starting-point-side interlayer connection node (c) and the route between the end point node (b) and the end-point-side interlayer node (d) are calculated in the square area of the second mesh, and between the starting-point-side interlayer connection node (c) and the end-point-side interlayer node (d), the route is calculated in the high class layer (first layer) comprised of freeways and major arteries. Therefore, even if a route to be calculated is a long distance route, time needed for route computation can be greatly reduced.

The route calculation device as above described can perform the following processes, in addition to the processes presented above. That is, (1) It is also possible that the starting point node (a) and the end point node (b) are set on any road segment of alleyways and the like. However, if these nodes are set on alleyways, a traffic jam will be rather incurred because vehicles take a long way around the alleyways. Therefore, the starting point node (a) and the end point node (b) are set in general on arteries.

(2) If a vehicle current location and a destination are on arteries, the current location is set as the starting point node (a) and the destination set as the end point node (b).

(3) The recommended route between the starting point node (a) and the starting-point-side interlayer connection node (c), and the recommended route between the end point node (b) and the end-point-side interlayer connection node (d) are first calculated. Thereafter, the route between the starting-point-side interlayer connection node (c) and the end-point-side interlayer node (d) is calculated.

(4) Recalculation is performed while travelling.

(5) A vehicle operator specifies junctions on alleyways, based on a road map, and then sets a route from the current location to the starting point node (a) or a route from the destination to the end point node (b).

(6) When traffic information such as traffic jam, accidents, road construction and the like are obtained from a control station, a recommended route to which bypasses and the like are added is calculated, taking such information into account.

FIG. 8 is a block diagram showing the major process steps used for route guidance.

In step 1, until a vehicle comes close to the starting point node (a), the vehicle location (e), the starting point node (a) and the road map containing the location (e) and the node (a) are displayed as shown in FIG. 4A. In step 2, the approach of the vehicle to the starting point node (a) is monitored and detected. In step 3, the road map containing the starting point node (a) is read from the map memory 3. In step 4, the road map data read is converted to an enlarged display format which displays the road map containing the starting node (a), the vehicle location [e] and the recommended route (f) on the whole of the picture screen, as shown in FIG. 4B. In step 5, the data converted to the enlarged display format is supplied to the second CPU 19. The second CPU 19 then writes the data converted to the enlarged display format to the frame memory 21, and causes the display 1 to display the road map containing the starting node (a), the vehicle location (e) and the recommended route (f) with the enlarged display format. In step 6, the approach of the vehicle to a node to which the vehicle is to be guided next is monitored and detected. In step 7, it is determined whether or not the node (n) that the vehicle is approaching is the end point node (b). If not the end point node (b), the step 7 proceeds to step 8, in which a road map containing the node (n) is read from the map memory 3, and the steps 4 and 5 are again performed. That is, the step 6 is repeated until the node (n) becomes the end point node (b). When, on the other hand, it is determined in the step 7 that the node (n) is the end point node (b), the end point node (b) is displayed in step 9 on a wide range of a road map, together with the destination. The step 9 proceeds to step 10 to complete the route guidance program.

According to the route guidance as above described, between the current location and the starting point node (a) of the recommended route, the vehicle location and the starting point node (a) are displayed together with the road map, and between the end point node (b) of the recommended route and the destination, the vehicle location and the destination are displayed be together with the road map. Therefore, since the vehicle location is grasped in a wider region, the route guidance system according to the present invention is adaptable to the case that a vehicle travels alleyways at relatively lower speeds or the case that a vehicle travels streets which are completely unknown to the vehicle operator. In addition, since each junction is displayed with a better visibility form between the starting point node (a) of the recommended route and the end point node (b) of the recommended route, the route guidance system according to the present invention is also adaptable to roads such as arteries wherein it is necessary to judge the form of junctions momentarily while travelling at high speeds. Particularly, in the intersection having a plurality of branch paths as shown in FIG. 4B, the vehicle operator is able to know in a moment which road to select, because an optimum route is displayed with an enlarged display, together with the road map. Accordingly, the vehicle can be guided safe. Moreover, since the road map or recommended route is rotated on the vehicle location and displayed, the route guidance system according to the present invention is easy to confirm the directions of other roads relative to the travelling direction of the vehicle, and convenient in selecting a route.

Figure 9A:
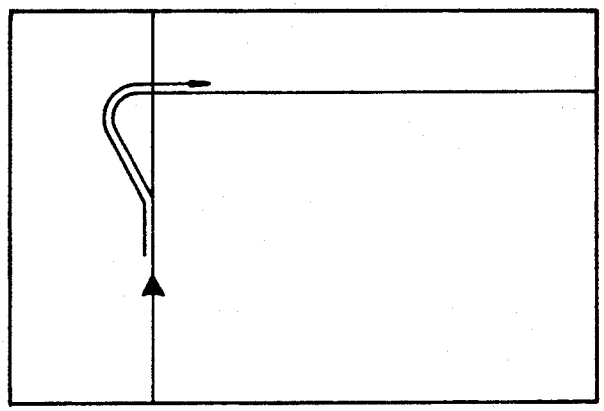
FIGS. 9A through 9C show graphic displays of sophisticated junctions that are displayed on the picture screen in accordance with the embodiment of the in-vehicle navigator according to the present invention.
Figure 9B:
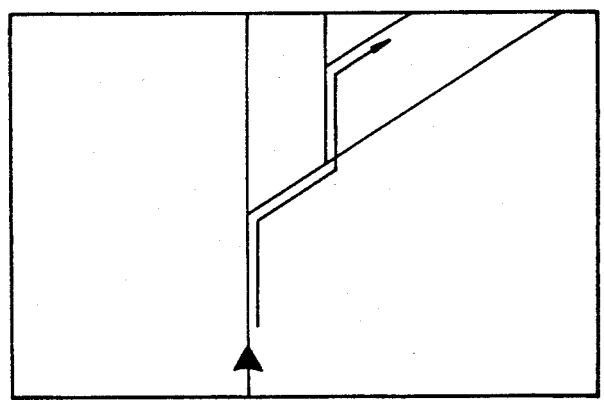
Figure 9C:
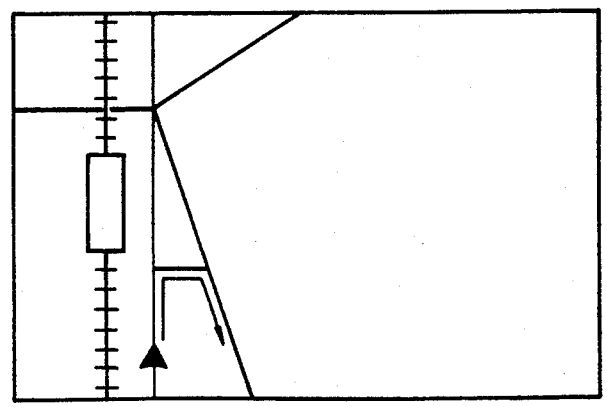

FIGS. 9A to 9C illustrate sophisticated junctions that are displayed in accordance with the route guidance system as above described. In an elevated junction system wherein a vehicle is required to travel a left vehicle lane in order to turn to the right, the vehicle operator can visually know that it is necessary to take the left vehicle lane in advance to turn to the right, as shown in FIG. 9A. Even in the case a plurality of junctions continue, the vehicle operator can easily follow the recommended route, since after the first intersection has been passed, the direction to which the vehicle travel at the next intersection is displayed, as shown in FIG. 9B. In the sophisticated intersection around a railway station as shown in FIG. 9C, the vehicle can know in advance the roads around the station, and the distraction of worrying about becoming lost can be alleviated since the recommended route is displayed. It is also possible that, in a junction of simple form, the direction along the recommended route is displayed only.

From the foregoing description, it will be seen that the present invention can provide a route desired by the vehicle operator, by allowing the vehicle operator to input a destination and desired route calculation conditions through the initialization means, and calculating a recommended route by the route calculation means on the basis of on the route calculation conditions inputted with the initialization means. Each time the vehicle approaches the junction of the recommended route stored in the memory means, the vehicle guidance means reads road map data containing that junction from the map memory means, and enlarges and displays the road map containing the junction, the vehicle location and the recommended route. Accordingly, the vehicle operator is able to easily know the travelling direction of the vehicle visually and drive the vehicle safe.

The invention has been described with reference to the preferred embodiment. Obviously modifications and alternations will occur to others upon a reading and understanding of this application. It is intended to include all such modifications and alternations insofar as they come within the scope of the appended claims or the equivalents thereof.

What we claim is:

1. An in-vehicle navigator comprising:

map memory means for storing road map data consisting of road data comprised of the combination of nodes and links, and background data such as buildings;

location detection means for detecting a vehicle location;

initialization means for inputting a destination and a route calculation condition, which is selected by a vehicle operator from a plurality of route calculation conditions determined based on an evaluation function $Fi = \Sigma (\alpha mi \times Am)$ where i is a route mode number, $\Sigma (\alpha m = 1, \alpha m (m=1, 2, ..., n)$ is a weighted ratio of Am and A is an attribute of a link, or a varied route calculation condition, which is obtained by varying a weighted ratio $\alpha$ of said evaluation function to a desired value of said vehicle operator;

route calculation means for reading road map data containing a current location and said destination from said map memory means, and for calculating a recommended route, based on said read road map and said selected or varied route computation condition inputted by said initialization means;

memory means for storing said recommended route; and vehicle guidance means for detecting an approach to a junction on said recommended route, based on said vehicle location detected by said location detection means, and for reading road map data containing said function from said map memory means, and for enlarging and displaying the road map containing said junction, together with said vehicle location and said recommended route.

2. An in-vehicle navigator as set forth in claim 1, wherein said road map data stored in said map memory means is classified in accordance with road classification from a highest class map wherein spacing between said nodes of said road data is widest to a lowest class map wherein spacing between said nodes of said road data is narrowest, and wherein said route calculation means defines a route retrieval area, based on a straight distance leading from said current location to said destination, and if said route retrieval area is in the same class map, calculates a recommended route by adding within the same class map links leading from a node nearest to said current location to a node nearest to said destination, and if said route retrieval area is not in the same class, retrieves from said road data a current-location-side connection node connecting a lower class map and a higher class map and a destination-side connection node connecting said lower class map and said higher class map, and calculates a recommended route leading from a node nearest to said current location to a node nearest to said destination by the sum of a route of said lower class map from said node nearest to said current location to said current-location-side connection node, a route of said lower class map from said node nearest to said destination to said destinationside connection node and a route of said higher class map from said current-location-side connection node to said destination-side connection node.

3. An in-vehicle navigator as set forth in claim 2, wherein said vehicle guidance means displays on the road map a starting point of said recommended route calculated by said route calculation means and said vehicle location until the vehicle reaches said starting point, displays said recommended route, said vehicle location and form of said junction on the whole of a picture screen or a window of said picture screen during travel of said recommended route, and displays on the road map said destination and said vehicle location during travel from an end point of said recommended route to said destination.

4. An in-vehicle navigator as set forth in claim 1, wherein said vehicle guidance means performs a display of road map and vehicle location or a display of recommended route, vehicle location and junction form or a display of the combination of road map, recommended route, vehicle location and junction form, depending upon attributes of roads, attributes of junctions and unfamiliarities of areas of said vehicle operator.

5. An in-vehicle navigator comprising:

map memory means for storing road map data consisting of road data comprised of the combination of nodes and links, and background data such as buildings, said road map data stored in said map memory means being classified in accordance with road classification from a highest class map wherein spacing between said nodes of said road data is widest to a lowest class map wherein spacing between said nodes of said road data is narrowest;

location detection means for detecting a vehicle location;

initialization means for inputting a destination, and route calculation conditions desired by a vehicle operator;

route calculation means for reading road map data containing a current location and said destination from said map memory means, and for calculating a recommended route, based on said read road map data and said route computation conditions inputted by said initialization means;

said route calculation means defining a route retrieval area, based on a straight distance leading from said current location to said destination, and calculating a recommended route by adding within the same class map the links leading from a node nearest to said current location to a node nearest to said destination, if said route retrieval area is in the same class map, and retrieving from said road data a current-location-side connection node connecting a lower class map and a higher class map and a destination-side connection node connecting said lower class map and said higher class map, if said route retrieval area is not in the same class, and calculating a recommended route leading from a node nearest to said current location to a node nearest to said destination by the sum of a route of said lower class map from said node nearest to said current location to said current-location-side connection node, a route of said lower class map from said node nearest to said destination to said destination-side connection node and a route of said higher class map from said current-location-side connection node to said destination-side connection node;

memory means for storing said recommended route; and vehicle guidance means for detecting an approach to a junction on said recommended route, based on said vehicle location detected by said location detection means, and for reading road map data containing said junction from said map memory means, and for enlarging and displaying the road map containing said junction, together with said vehicle location and said recommended route.

6. An in-vehicle navigator as set forth in claim 5, wherein said vehicle guidance means displays on the road map a starting point of said recommended route calculated by said route calculation means and said vehicle location until the vehicle reaches said starting point, displays said recommended route, said vehicle location and form of said junction on the whole of a picture screen or a window of said picture screen during travel of said recommended route, and displays on the road map said destination and said vehicle location during travel from an end point of said recommended route to said destination.

7. An in-vehicle navigator as set forth in claim 5, wherein said vehicle guidance means performs a display of road map and vehicle location or a display of recommended route, vehicle location and junction form or a display of the combination of road map, recommended route, vehicle location and junction form, depending upon attributes of roads, attributes of junctions and unfamiliarities of areas of said vehicle operator.

* * * * *